United States Patent
Weathersby et al.

(10) Patent No.: US 11,891,016 B2
(45) Date of Patent: *Feb. 6, 2024

(54) VEHICLE CONTROL SYSTEM AND MOBILE DEVICE USED AS VEHICLE KEY FOB

(71) Applicant: VOXX INTERNATIONAL CORPORATION, Hauppauge, NY (US)

(72) Inventors: Geoff Weathersby, Solana Beach, CA (US); Robert Andre Lacroix, Lachine (CA); Elie Issa, Laval (CA)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,237

(22) Filed: Feb. 21, 2023

(65) Prior Publication Data

US 2023/0256938 A1 Aug. 17, 2023

Related U.S. Application Data

(63) Continuation of application No. 17/100,597, filed on Nov. 20, 2020, now Pat. No. 11,603,076, which is a
(Continued)

(51) Int. Cl.
*H04W 4/80* (2018.01)
*B60R 25/24* (2013.01)
(Continued)

(52) U.S. Cl.
CPC ........ *B60R 25/245* (2013.01); *B60R 25/1001* (2013.01); *B60R 25/1003* (2013.01);
(Continued)

(58) Field of Classification Search
CPC .................................................. B60R 25/245
See application file for complete search history.

(56) References Cited

U.S. PATENT DOCUMENTS

| 6,570,486 B1 * | 5/2003 | Simon ..................... B60R 25/04 340/5.1 |
| 2016/0019734 A1 * | 1/2016 | Bauman ............. G07C 9/00309 340/5.61 |

(Continued)

*Primary Examiner* — Joseph H Feild
*Assistant Examiner* — Pameshanand Mahase
(74) *Attorney, Agent, or Firm* — ALLEN, DYER, DOPPELT, + GILCHRIST, P.A. Attorneys at Law

(57) ABSTRACT

An apparatus includes a vehicle control system (VCS) coupled to a computer of a vehicle via a CAN bus and configured to present selectively appearance of a presence in the vehicle of a smartkey, e.g., by energizing and de-energizing an actual smartkey of the vehicle. The VCS includes a VCS and a Bluetooth® VCS transceiver. The VCS stores VCS software. The apparatus also includes a smartphone with a Bluetooth® transceiver, and storing an app. The mobile device is paired with the VCS to communicate with the VCS via a Bluetooth® link. The app configures the smartphone to receive menu selections from a user, to generate communications that identify smartkey-enabled features of the VCS that correspond to the selections, and to send to the VCS the communications through the link. The VCS software configures the VCS to receive the communications and cause the vehicle to perform actions corresponding to the communications.

21 Claims, 11 Drawing Sheets

Related U.S. Application Data continuation of application No. 16/529,754, filed on Aug. 1, 2019, now Pat. No. 10,857,977.

(51) Int. Cl.
  *G07C 9/00* (2020.01)
  *B60R 25/20* (2013.01)
  *B60R 25/10* (2013.01)
  *H04W 4/02* (2018.01)
  *B60R 25/40* (2013.01)

(52) U.S. Cl.
  CPC .......... *B60R 25/209* (2013.01); *B60R 25/406* (2013.01); *G07C 9/00174* (2013.01); *H04W 4/023* (2013.01); *H04W 4/80* (2018.02); *B60R 2325/101* (2013.01); *B60R 2325/205* (2013.01); *G07C 2009/00769* (2013.01); *G07C 2009/00984* (2013.01)

(56) References Cited

U.S. PATENT DOCUMENTS

| | | | |
|---|---|---|---|
| 2019/0168775 A1* | 6/2019 | Van Wiemeersch | ......................... B60R 25/102 |
| 2019/0202348 A1* | 7/2019 | Elangovan | ............... B60Q 1/48 |

\* cited by examiner

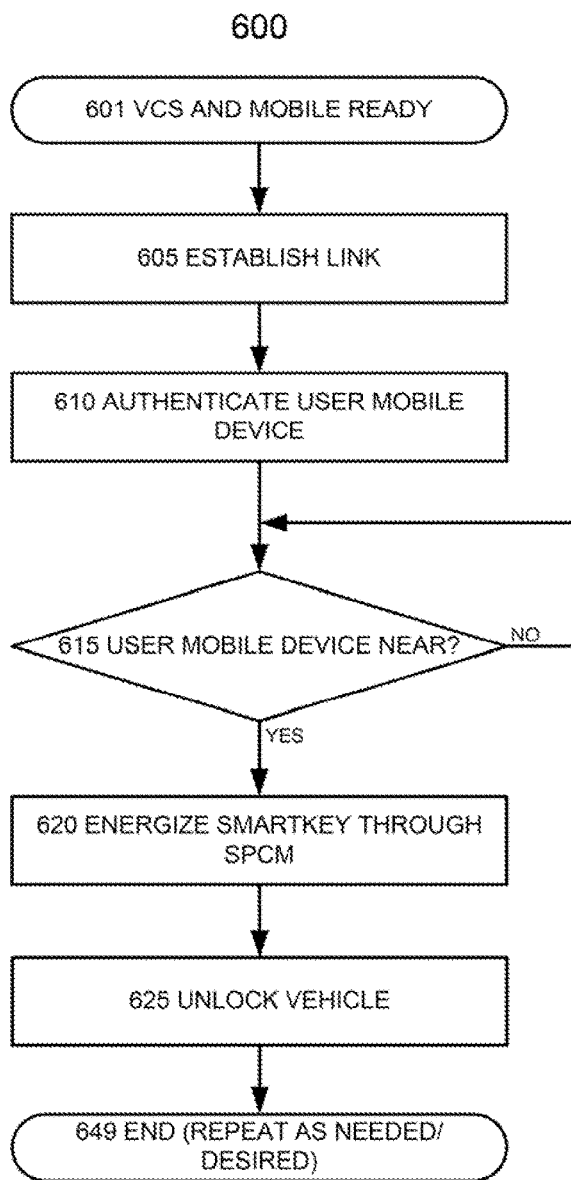
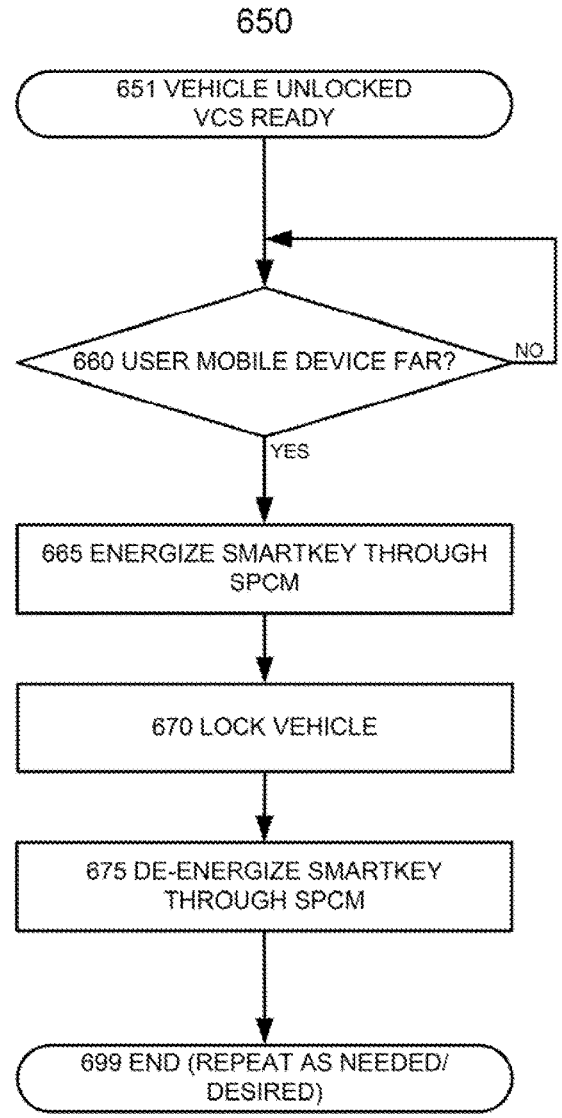
FIG. 6A
FIG. 6B

VEHICLE CONTROL SYSTEM AND MOBILE DEVICE USED AS VEHICLE KEY FOB

CROSS-REFERENCE TO RELATED APPLICATION

This application is a continuation of and claims priority to U.S. patent application Ser. No. 17/100,597, entitled VEHICLE CONTROL SYSTEM AND MOBILE DEVICE USED AS VEHICLE KEY FOB, filed Nov. 20, 2020, now allowed; which is a continuation of and claims priority to U.S. patent application Ser. No. 16/529,754, entitled VEHICLE CONTROL SYSTEM AND MOBILE DEVICE USED AS VEHICLE KEY FOB, filed Aug. 1, 2019, now U.S. Pat. No. 10,857,977.

FIELD OF THE DISCLOSURE

This disclosure relates generally to the field of vehicular and other security, access, convenience, monitoring, and control products.

BACKGROUND

Vehicle control systems ("VCS"s) may be OEM and aftermarket electronic systems installed in vehicles for monitoring, security, and users' convenience and entertainment, as well as for other reasons. The functionality provided by such systems may include remote start capability, passive keyless entry, passive locking, and other security, convenience, and monitoring features.

A need in the art exists for improved techniques for operating certain security, convenience, and monitoring features of VCS-equipped vehicles, including operating the features with a mobile device such as a smartphone, without carrying a key, key fob, or analogous access device. A need in the art exists for providing temporary and/or limited access to vehicles and their various features and compartments. Other needs in the art will occur to a person skilled in the art after careful perusal of this disclosure, claims, figures, and all other matter filed together with this document.

SUMMARY

This document describes embodiments, variants, implementations, and examples of novel techniques for addressing one or more of the needs identified above, and/or other needs. Selected embodiments described in this document include methods, apparatus, and articles of manufacture that enable improved techniques of using a mobile device, such as a smartphone, as a vehicle key.

In an embodiment, an apparatus includes a vehicle control system and a mobile device. The vehicle control system is coupled to vehicle electronics of a vehicle via a vehicle bus. The vehicle control system is configured to simulate presence in the vehicle of a smartkey of the vehicle. The vehicle control system includes one or more VCS processors and a relatively short range radio frequency VCS transceiver. The vehicle control system stores VCS software. The mobile device includes one or more mobile device processors and a relatively short range radio frequency mobile device transceiver. The mobile device stores an app. The mobile device is configured to pair with the vehicle control system to communicate with the vehicle control system via a communication link between the relatively short range radio frequency mobile device transceiver and the relatively short range radio frequency VCS transceiver. When the app is executed by the one or more processors of the mobile device, the app configures the mobile device to receive menu selections from a user of the mobile device, to generate transmissions that identify smartkey-enabled features of the vehicle control system that correspond to the selections, and to transmit to the vehicle control system the transmissions through the communication link. When the VCS software is executed by the one or more VCS processors, it configures the vehicle control system to receive the transmissions and cause the vehicle to perform actions corresponding to the transmissions.

In aspects, the vehicle bus is a CAN bus.

In aspects, the relatively short range radio frequency VCS transceiver and the relatively short range radio frequency mobile device transceiver are Bluetooth® transceivers.

In aspects, the smartkey-enabled features include engine start, vehicle lock, vehicle unlock, vehicle alarm activation, and/or vehicle alarm deactivation.

In aspects, the vehicle control system is configured to simulate the presence in the vehicle of the smartkey of the vehicle by sensing on the vehicle bus smartkey challenges transmitted by the vehicle electronics, and in response to the challenges transmit challenge responses to the vehicle electronics through the vehicle bus.

In aspects, the vehicle control system is connected to one or more antennae used by vehicle electronics to transmit smartkey challenges and receive challenge responses, and the vehicle control system is configured to simulate the presence in the vehicle of the smartkey of the vehicle by sensing on the one or more antennae the smartkey challenges, and in response to the challenges generate the challenge responses and transmit the challenge responses to the vehicle electronics through the one or more antennae.

In an embodiment, an apparatus includes a vehicle control system configured to couple to a computer of a vehicle via a vehicle bus of the vehicle, and a mobile device. The vehicle control system includes one or more VCS processors, a relatively short range radio frequency VCS transceiver, and a smartkey power control module (SPCM) configured to provide to a smartkey of the vehicle electrical power selectively under control of the one or more VCS processors, thereby selectively enabling and selectively preventing operation of smartkey-enabled features of the vehicle. The vehicle control system stores, in a memory, VCS software instructions executable by the one or more VCS processors. The mobile device includes one or more mobile device processors and a relatively short range radio frequency mobile device transceiver. The mobile device stores in its memory an app (instructions executable by the one or more mobile device processors). When the app is executed by the one or more mobile device processors, the app configures the mobile device to pair with the vehicle control system to establish a communication link between the relatively short range radio frequency mobile device transceiver and the relatively short range radio frequency VCS transceiver, to determine events associated with smartkey-enabled features of the vehicle, an event per smartkey-enabled feature of the smartkey-enabled features, to generate transmissions based on the events, a transmission per event, and to send to the vehicle control system the transmissions through the communication link. When the VCS software is executed by the one or more VCS processors, the VCS software configures the vehicle control system to pair with the mobile device to establish the communication link, to receive the transmissions from the mobile device, and for each of the transmissions received from the mobile device to perform an action corresponding to the smartkey-enabled feature associated with the event on which said each of the transmissions is based. An event associated with a smartkey-enabled feature is any occurrence that is designed to cause performance of a smartkey-enable feature, such as the user's selection on the smartphone of a menu item designed to activate the feature (e.g., lock the vehicle, unlock the vehicle, arm the vehicle's security system, disarm the security system, open/close the vehicle's door(s)).

In aspects, the mobile device also includes at least one other transceiver, for example, a cellular transceiver and a WiFi transceiver.

In aspects, the relatively short range radio frequency VCS transceiver and the relatively short range radio frequency mobile device transceiver are Bluetooth® transceivers.

In aspects, the smartkey-enabled features include an engine start feature, a vehicle lock feature, a vehicle unlock feature, a vehicle alarm activation feature, and a vehicle alarm deactivation feature.

In aspects, some of the events are selections of menu items made by a user of the mobile device on the mobile device.

In aspects, the events include automatic detection of approach of the mobile device to the vehicle.

In aspects, the events include automatic detection of departure of the mobile device from the vehicle.

In aspects, the events include one or more passive keyless entry-related events.

In aspects, the events include one or more automatic passive action-related events.

In aspects, the smartkey power control module is or includes a relay, such as an electromechanical or a solid state relay.

In aspects, the apparatus also includes the smartkey secured in the vehicle control system or otherwise in the vehicle. The smartkey has a pair of power input terminals, such as battery terminals. The relay may include a pair of normally open contacts in series with the power input terminals of the smartkey, so that the smartkey is energized when the relay is energized, and the smartkey is de-energized when the relay is de-energized.

In aspects, the vehicle control system is connected to one or more antennae used by vehicle electronics to transmit smartkey challenges and receive challenge responses, and the vehicle control system is configured to simulate the presence in the vehicle of the smartkey of the vehicle by sensing on the one or more antennae the smartkey challenges, and in response to the challenges generate the challenge responses and transmit the challenge responses to the vehicle electronics through the one or more antennae.

In aspects, the mobile device also includes at least one other transceiver.

In aspects, the mobile device also includes a cellular transceiver.

In aspects, the mobile device includes a user interface configured to receive the menu selections from the user.

In an embodiment, a system includes a vehicle controller module such as a VCS controlling a vehicle and allowing door lock/unlock control, a keyfob power controller commanded by the VCS, a short-range radio frequency ("RF") transceiver connected through a wired or wireless connection to the VCS, and a mobile phone that can communicate with the RF transceiver. The system is configured so that upon the mobile phone being able to communicate with the RF transceiver, the VCS:
  authenticates the mobile phone and identifies it as a valid/authorized vehicle access token/device,
  detects that the user carrying the mobile phone is in proximity of the vehicle's doors,
  unlocks one or more vehicle doors, and
  enables the vehicle keyfob via the keyfob power controller, thereby allowing the user to enter and operate the vehicle.

In aspects, the VCS causes the vehicle's doors to lock in response to sensing that the mobile phone is beyond the proximity of the vehicle's doors.

In an embodiment, a system includes a vehicle controller module such as a VCS controlling a vehicle, allowing door lock/unlock control, and sensing door handle controls. The system also includes a keyfob power controller commanded by the VCS. The system further includes a short-range RF transceiver connected through a wired or wireless connection to the VCS. The system further includes a mobile phone that can communicate with the RF transceiver. The system is configured so that upon the mobile phone being able to communicate with the RF transceiver, the VCS:
  authenticates the mobile phone identifies it as a valid vehicle access token/device,
  detects that the user carrying the mobile phone is in proximity of the vehicle's doors,
  in response to sensing a change in state of the door handle controls, unlocks one or more vehicle doors and enables the vehicle keyfob via the keyfob power controller,
  thereby allowing the user to enter and operate the vehicle.

In aspects, the VCS causes the doors to lock in response to sensing that the mobile phone is beyond the proximity of the vehicle's doors.

In an embodiment, a system includes a vehicle controller module such as a VCS controlling a vehicle and allowing door lock/unlock control, a keyfob power controller commanded by the VCS, a short-range RF transceiver connected through a wired or wireless connection to the VCS, a second short-range RF transceiver connected through a wired or wireless connection to the VCS and supporting a larger range of communication than the first short-range RF transceiver, and a mobile phone that can communicate with the RF transceivers. The system is configured so that upon the mobile phone being able to communicate with the second longer-range RF transceiver,
  the VCS authenticates the mobile phone and identifies it as a valid vehicle access token/device, and
  in response to the mobile phone being able to communicate with the first shorter-range RF transceiver, the VCS detects the user carrying the mobile phone is in proximity of the vehicle's doors, unlocks one or more vehicle doors, and enables the vehicle keyfob via the keyfob power controller, thereby allowing the user to enter and operate the vehicle.

In aspects, the VCS causes the doors to lock in response to sensing that the mobile phone is beyond the proximity of the vehicle's doors.

In an embodiment, a system includes a vehicle controller module such as a VCS controlling a vehicle and allowing door lock/unlock control, a keyfob power controller commanded by the VCS, a short-range RF transceiver connected through a wired or wireless connection to the VCS, a second short-range RF transceiver connected through a wired or wireless connection to the VCS and supporting a larger range of communication than the first short-range RF transceiver, and a mobile phone that can communicate with the RF transceivers. The system is configured so that upon the mobile phone being able to communicate with the second longer-range RF transceiver, the VCS:

authenticates the mobile phone and identifies it as a valid vehicle access token/device, and in response to the mobile phone being able to communicate with the first shorter-range RF transceiver, the VCS detects that the user carrying the mobile phone is in proximity of the vehicle's doors, unlocks one or more vehicle doors, and enables the vehicle keyfob via the keyfob power controller, thereby allowing the user to enter and operate the vehicle.

In aspects, the VCS causes the doors to lock in response to sensing that the mobile phone is beyond the proximity of the vehicle's doors.

In an embodiment, a system includes: a vehicle controller module such as a VCS controlling a vehicle, allowing door lock/unlock control, and sensing door handle controls; a keyfob power controller commanded by the VCS; a short-range RF transceiver connected through a wired or wireless connection to the VCS; a second short-range RF transceiver connected through a wired or wireless connection to the VCS and supporting a larger range of communication than the first short-range RF transceiver; and a mobile phone that can communicate with the RF transceivers. The system is configured so that upon the mobile phone being able to communicate with the second longer-range RF transceiver, the VCS authenticates the mobile phone and identifies it as a valid vehicle access token/device. The system is further configured so that upon the mobile phone being able to communicate with the first shorter-range RF transceiver, the VCS detects the user carrying the mobile phone is in proximity of the vehicle's doors, and in response to the VCS sensing a change in the state of the door handle controls, unlocks one or more vehicle doors and enables the vehicle keyfob via the keyfob power controller, thereby allowing the user to enter and operate the vehicle.

In aspects, the VCS causes the doors to lock in response to sensing that the mobile phone is beyond the proximity of the vehicle's doors.

Various features and aspects will be better understood with reference to the following description, drawings, and claims.

BRIEF DESCRIPTION OF THE FIGURES

FIG. 6A illustrates selected steps of an exemplary smartphone-as-a-key passive keyless entry process, in accordance with selected aspects disclosed in this document;

FIG. 6B illustrates selected steps of an exemplary passive keyless vehicle locking process, in accordance with selected aspects disclosed in this document;

DETAILED DESCRIPTION

Figure 1:
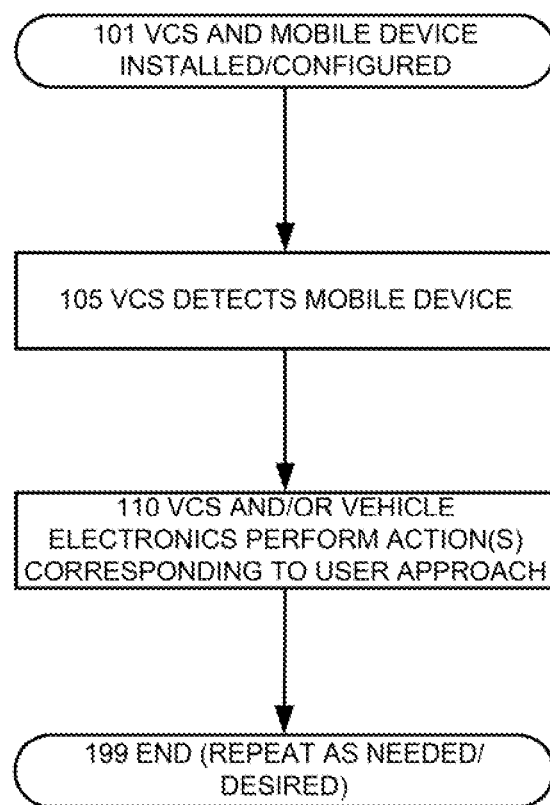
FIG. 1 illustrates selected steps of an exemplary smartphone-as-a-key process, in accordance with selected aspects disclosed in this document.

The words "embodiment," "variant," "example," "implementation," and similar words and expressions as used in this document refer to a particular apparatus, process, or article of manufacture, and not necessarily to the same apparatus, process, or article of manufacture. Thus, "one embodiment" (or a similar word/expression) used in one place or context may refer to a particular apparatus, process, or article of manufacture; the same or a similar expression in a different place or context may refer to a different apparatus, process, or article of manufacture. The expression "alternative embodiment" and similar words and phrases may be used to indicate one of a number of different possible embodiments, variants, examples, or implementations. The number of possible embodiments, variants, examples, or implementations is not necessarily limited to two or any other quantity. Characterization of an item as "exemplary" means that the item is used as an example. Such characterization does not necessarily mean that the embodiment, variant, example, or implementation is a preferred one; the embodiment, variant, example, or implementation may but need not be a currently-preferred embodiment, variant, example, or implementation. All embodiments, variants, examples, and implementations are described for illustration purposes and are not necessarily strictly limiting.

The words "couple," "connect," and similar words/expressions/phrases with their inflectional morphemes, do not necessarily import an immediate or direct connection, but in addition to direct connections include within their meaning connections through mediate elements.

The expression "processing logic" should be understood as selected steps/decision blocks and/or hardware/software/firmware for implementing the selected steps/decision blocks. "Decision block" means a step in which a decision is made based on some condition, and subsequent process flow is selected based on whether the condition is met or not met.

An "access point" or "entry point" may be, e.g., door, sunroof, hatch (rear or otherwise), trunk of a vehicle/building/apartment/office, and other means for accessing a place or a thing.

"Passive keyless entry" or "PKE" refers to vehicle control systems that can be configured to unlock a vehicle automatically in response to an authorized person approaching and being in proximity of the vehicle in which the system is installed. Some PKE-capable systems can be configured to unlock the vehicle in response to a door (or another entry point) handle of the vehicle being operated (e.g., pulled by the user). Some PKE-capable systems can be configured to unlock the vehicle in response to a door (or another entry point) handle touch or pull sensor signal, or a button on the vehicle being pushed or otherwise activated by the user. Some PKE-capable systems can be configured to lock the vehicle automatically in response to the user moving (e.g., walking) away from the vehicle. PKE-capable systems may be used with vehicles other than passenger land vehicles, e.g., planes, boats, snow vehicles; and to secure structures or portions of structures, e.g., as part of home/business security systems and locks. "Automatic" in reference to an action, "automatic passive action" capability, and "APA" capability refer to the capability of a system to take action automatically in response to a user with an authorized device approaching and/or departing a place or a thing, such as a predetermined location, a vehicle, a building/structure or a predetermined portion of a building/structure. The action may be, e.g., locking/unlocking/opening/closing an access point or several access points of a vehicle/building/apartment/office; operating lights of a vehicle/building/apartment/office; operating horn or another sound device of a vehicle/building/apartment/office; activating/deactivating alarm of a vehicle/building/apartment/office; turning on and off engines/appliances, climate control systems, and/or entertainment devices. Thus, a PKE-capable system is an APA-capable system. The authorized device may be a portable device, e.g., a key fob, a smartphone/tablet/computer, a smart watch, a wireless communications-capable bio- or biometric implant, or another device. APA-capable and PKE-capable systems are described, for example, in U.S. Patent Application entitled SMARTPHONE BASED PASSIVE KEYLESS ENTRY SYSTEM, Michael S. Simmons inventor, Ser. No. 14/459,036, filed on or about Aug. 13, 2014, U.S. Patent Application Publication Number 2015/0048927; and in U.S. Patent Application entitled MULTI-SENSOR PASSIVE KEYLESS FUNCTIONALITY, Aravind Warrier et al., inventors, Ser. No. 16/401,704, filed on or about May 2, 2019. The above-referenced patent applications and the related provisional application are incorporated herein by reference for all purposes, including their specifications, abstracts, figures, claims, and all other matter.

A vehicle control system (VCS) is generally (but not necessarily exclusively) an aftermarket system installed in a vehicle to provide convenience, security, and monitoring features, such as security system functionality, PKE/APA, door unlocking and/or opening in response to a person carrying a key or a key fob touching or moving door/hatch handles or otherwise, door locking and/or closing, remote engine start, short-range radio frequency communications (Bluetooth® and other) with portable devices such as smartphones, tablets, smart implants, and similar functions. A VCS may be such as (or similar to, or having selected components of) the vehicle control systems described in a commonly-owned U.S. Pat. No. 10,249,182 for REMOTE VEHICLE SYSTEM CONFIGURATION, CONTROL, AND TELEMATICS, James S. Turner first-named inventor, which is incorporated herein by reference for all purposes, including specification, abstract, figures, claims, and all other matter. A VCS may also be of another type.

A VCS installed in a vehicle may be connected to the Controller Area Network bus ("CAN bus") of the vehicle, and interface/communicate with the vehicle's electronics/computer via the CAN bus. The VCS may also sense CAN bus communications between and among the vehicle's electronic components. Another type of bus interconnecting the vehicle's electronics may take place of the CAN bus.

"Mobile device" (or simply "mobile") and "portable device" are used interchangeably, to signify smartphones, smartwatches, tablets, smart implants, portable computers, and similar portable devices. A mobile device typically includes a processing module (such as microprocessor(s), microcontroller(s), other programmable devices, and their memories and other supporting electronic components); a user I/O interface (such as a display/keyboard/touch-sensitive display); and one or more transceivers (such as cellular transceivers, WiFi transceivers, Bluetooth® and other short-range radio frequency transceivers), and other devices.

Smart key and smart key fob may be referred to as "smartkey." In typical use, the vehicle (vehicle computer, vehicle electronics) may send a signal (a "challenge") to a smartkey, to determine whether the smartkey is present inside the vehicle or in the immediate vicinity of the vehicle; when the smartkey responds (by sending a "challenge response"), the vehicle (vehicle computer/electronics) may allow engine start and/or operation of all or selected convenience and security features, such as locking/unlocking the vehicle and arming/disarming the vehicle's alarm. The smartkey's response may be static or, more commonly, a result of a dynamic computation, e.g., to prevent spoofing. Some VCSs described in this document may be configured to sense challenges, generate appropriate challenge responses (instead of the smartkey), and send the challenge responses to the vehicle, thus simulating smartkey presence. Smartkeys are generally known in relation to use with cars and other vehicles, but analogous devices may be used with access, security, and convenience features of buildings and portions of buildings, including use with home/business security systems and locks.

Some definitions have been explicitly provided above. Other and further explicit and implicit definitions and clarifications of definitions may be found throughout this document.

In embodiments, the VCS and/or the smartkey of the vehicle are configured to make it appear to the vehicle's electronics/computer that the functionality associated with the smartkey's presence should be enabled. For example, the smartkey may be placed in the vehicle, and secured so that it cannot be readily found and/or removed; the smartkey may be secured, for example, in the enclosure of the VCS. The vehicle's electronics/computer would then be able to sense the presence of the smartkey in the vehicle and allow engine start and/or operation of convenience, security, and/or other features that require a smartkey of the vehicle to be inside or in the immediate vicinity of the vehicle ("smartkey-enabled features"). But the VCS connected to the vehicle's CAN bus (or another analogous type of a bus interconnecting electronics of the vehicle) can selectively prevent engine start and/or operation of the smartkey-enabled features. In this way, the security of the vehicle may be preserved despite the presence of the smartkey in the vehicle, because the VCS can selectively (under control of the VCS processor, through the bus) enable and prevent engine start and operation of the other smartkey-enabled features.

In an embodiment, the VCS is configured to simulate selectively the presence of the smartkey in or near the vehicle, by receiving from the vehicle's electronics the smartkey challenges, and generating the appropriate challenge responses, to make it appear to the vehicle's computer that the smartkey is present in or near the vehicle. For example, the VCS can receive the challenges from the CAN or analogous bus, and return appropriate challenge responses, also through the bus. In another example, the VCS may be connected through a transceiver to the antenna that the vehicle's computer/electronics use to transmit the smartkey challenges, and interpret the challenges actually sent by the vehicle electronics to the smartkey, unlike sensing the challenges through the bus. (The antenna here includes the wire connected to the antenna.) The VCS can then selectively (under control of the VCS processor) generate appropriate challenge responses to simulate the presence of the smartkey in/near the vehicle, and drive the antenna with these challenge responses. As has already been mentioned, the challenges and/or the responses may be static or dynamic; a dynamic response varies from time-to-time, location-to-location, challenge-to-challenge, and/or otherwise; the VCS and/or the mobile device have (or can obtain) information for determining/computing an appropriate response to a challenge, for example, in the same way as the vehicle's smartkey would.

In an embodiment, the VCS includes a smartkey power control module for the smartkey of the vehicle. The smartkey receives the electrical power for its operation when the VCS (under control of the VCS processor) determines that the operation of the smartkey-enabled features is allowed and/or required, and configures the smartkey power control module so that the smartkey is energized. The smartkey power control module may be an electrically-operated switch such as an electromechanical or a solid state relay; it may be placed, for example, in series with the battery contacts (power inputs) of the smartkey. When the smartkey power control module, under control of the VCS, turns on the power to the smartkey in the vehicle, the vehicle electronics sense the smartkey's presence and allow operation of the smartkey-enabled features. The smartkey may be, for example, secured to the vehicle and/or be placed inside the enclosure of the VCS or one of the modules of the VCS, to make unauthorized removal difficult. The VCS is configured to turn the power to the smartkey on when needed to operate any of the smartkey-enabled features, such as the panic command, engine start, door lock/unlock, security features enable/disable, and others.

The VCS in the vehicle may be configured to allow the engine start and/or operation of the other smartkey-enabled features in response to operation of a "virtual key" tied to the user's mobile device. The presence of a mobile device previously configured to connect with and control the VCS may be sufficient for the engine start and/or operation of the smartkey-enabled features. The VCS may be configured to recognize mobile devices authorized to control the VCS and enable the smartkey-enabled features. (Such authenticated mobile devices may be referred to as "authorized mobile devices.") The mobile device may provide an authorization code to the VCS over the connection, or be recognizable by the VCS based on the previously made connection. For example, the VCS may recognize the universally unique identifier ("UM") of the previously paired authorized mobile device, and allow operation of the smartkey-enabled features. As another example, the authorized mobile device may store a VCS authorization code and transmit it to the VCS over the connection, in response to being interrogated by the VCS, in response to sensing the VCS over the connection, in response to a command received from the user of the authorized mobile device, or otherwise. Once the VCS recognizes the authorized mobile device inside the vehicle or within some predetermined distance of the vehicle (e.g., as is described in the patent application Ser. No. 16/401,704, or otherwise), the VCS may enable automatic passive action such as passive keyless entry, and/or the smartkey-enabled features. A special app installed in the authorized mobile device may need to be activated and running in the foreground to enable APA/PKE, engine start, and/or other smartkey-enabled features. The app may provide menu(s) to the user of the authorized mobile device to enable the user to control the engine start and/or other selectable smartkey-enabled features through menu(s) or other inputs of the app executing on the mobile device. The user of the authorized mobile device (and of the vehicle) may control the engine start and/or other selectable smartkey-enabled features through menu(s) or other inputs provided by the app executing on the mobile device.

Thus, the user carrying the authorized mobile device may approach the vehicle to within a short distance such as within a few feet (<10 feet in variants) and then be able to start the engine and/or operate the other smartkey-enabled features in a conventional manner applicable to the vehicle, meaning in the same way as when the user is in possession of the vehicle's OEM (or replacement) smartkey. For example, the user may pull on the door/hatch handle, and the VCS, sensing the operation of the door handle and near presence of the user's mobile device, may unlock the door/hatch or another entry point or multiple entry points; the user may press engine start push button while sitting in the vehicle, and in response the VCS may enable/cause engine start; the user may approach the vehicle to some predetermined distance or mobile device signal strength, and in response the VCS may automatically unlock the vehicle and/or turn off security alarm or other security features. Analogously, the VCS may sense that the user's authorized mobile device is beyond a predetermined distance and moving away from the vehicle (and/or not being able to connect to the mobile device), and automatically lock the vehicle and/or turn on the vehicle's security system/features.

FIG. 1 illustrates selected steps of a process 100 of an exemplary smartphone-as-a-key ("SAAK") implementation, performed by a system including the combination of a vehicle-installed VCS and a user mobile device, each appropriately configured, respectively, by the VCS program code and the program code of the SAAK app on the user mobile device. The VCS may be connected to the CAN bus of the vehicle to sense when the vehicle's computer interrogates the smartkey by sending a challenge, and can respond with an appropriate challenge response, which the VCS retrieves from its memory and/or computes. The VCS may also be connected to the antenna that transmits the challenge and receives the challenge response, to receive the challenge and send back the appropriate challenge response. The VCS may also include a smartkey power control module connected to an actual smartkey of the vehicle, to energize the smartkey when the VCS determines that smartkey-enabled functionality should be enabled.

At flow point 101, the VCS is installed in the vehicle, programmed/configured for operation, and powered-up; and the app for configuring the user mobile device for SAAK is downloaded to the user mobile device and activated, appropriately configuring the user mobile device to communicate with the VCS (and thus making the user mobile device an authorized mobile device). Configuring may include pairing the user mobile device with the VCS, including storing the UUID of the VCS in the mobile device, and vice versa, so that the VCS UUID is registered with the operating system and/or the SAAK app of the mobile device, and the UUID of the mobile device is registered with the VCS. Additionally, at the flow point 101, the user mobile device is not in the "sleep" or power-conserving mode, and the app is running in the foreground. For example, if the user mobile device was in the sleep mode, when the user carrying the user mobile device activates the app, the app causes the user mobile device to exit the sleep mode and run the app in the foreground. As another example, the app wakes up when the user mobile device approaches the vehicle and the user mobile device senses the short-range RF (e.g., Bluetooth®) transmissions from the VCS.

From the flow point 101, the process continues to step 105, in which the VCS detects the presence of the mobile device within a short distance of the vehicle. The VCS may use its Bluetooth® or similar short-range RF communications capability to detect the presence of the mobile device and estimate the vehicle's distance to the mobile device; for example, the distance estimate may be based on the strength of the RF signal from the mobile device, though other techniques are possible. In a variant, an action of the user of the mobile device causes the VCS to look for the mobile device; the action may be, for example, the user's pulling on a handle of an entry point (e.g., the door handle of the vehicle), or the user's pushing an external button on the vehicle (e.g., next to an entry point).

In step 110, the VCS interacts with the vehicle's electronics to cause performance of an action (or actions, as the case may be) corresponding to the approach of the user, such as unlocking the vehicle or any of the entry points, turning off the alarm of the vehicle, etc. In embodiments, the interaction may include receiving the challenge from the vehicle's electronics (computer) and sending an appropriate challenge response to the vehicle's electronics, and sending a command to the vehicle's electronics to perform the action(s). In examples, the interaction may include enabling power to the smartkey through through the smartkey power control module connected to the VCS, and sending a command to the vehicle's electronics to perform the action(s).

The process 100 may conclude at flow point 199.

Figure 2A:
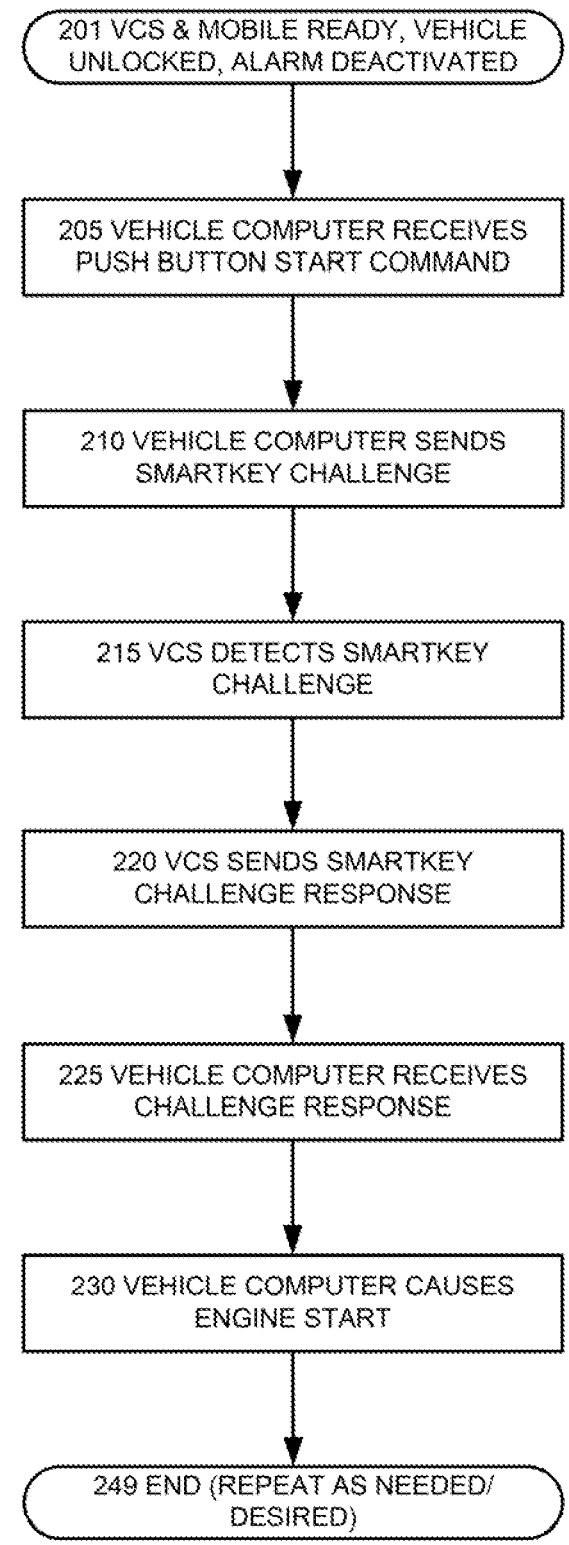
FIG. 2A illustrates selected steps of an exemplary smartphone-as-a-key process performed in response to activation of an engine start button, in accordance with selected aspects disclosed in this document.

One possible scenario following unlocking of the vehicle is when the user pushes the engine start button of the vehicle. FIG. 2A illustrates selected steps of a process 200 of an exemplary operation of the system in response to activation of the engine start button. The process 200 begins at flow point 201, such as the state of the mobile device and the VCS after the vehicle is unlocked in the process 100.

In step 205, the electronics (computer) of the vehicle receives the start command from the engine start button of the vehicle.

In step 210, the vehicle computer sends a smartkey challenge, to verify that the smartkey is in the vehicle.

In step 215, the VCS detects the challenge. For example, the VCS may detect the challenge through the antenna or the CAN bus. (In this embodiment, there might not be a smartkey stored in the vehicle, though the operation of the embodiment with the smartkey in the vehicle is analogous, mutatis mutandis, here and in the other described processes.) The VCS then generates a challenge response and sends it back to the vehicle computer, in step 220.

The vehicle electronics/computer receives the challenge response, in step 225, and causes engine start, in step 230.

The process flow may then terminate at flow point 249, and may be repeated as needed or desired.

Figure 2B:
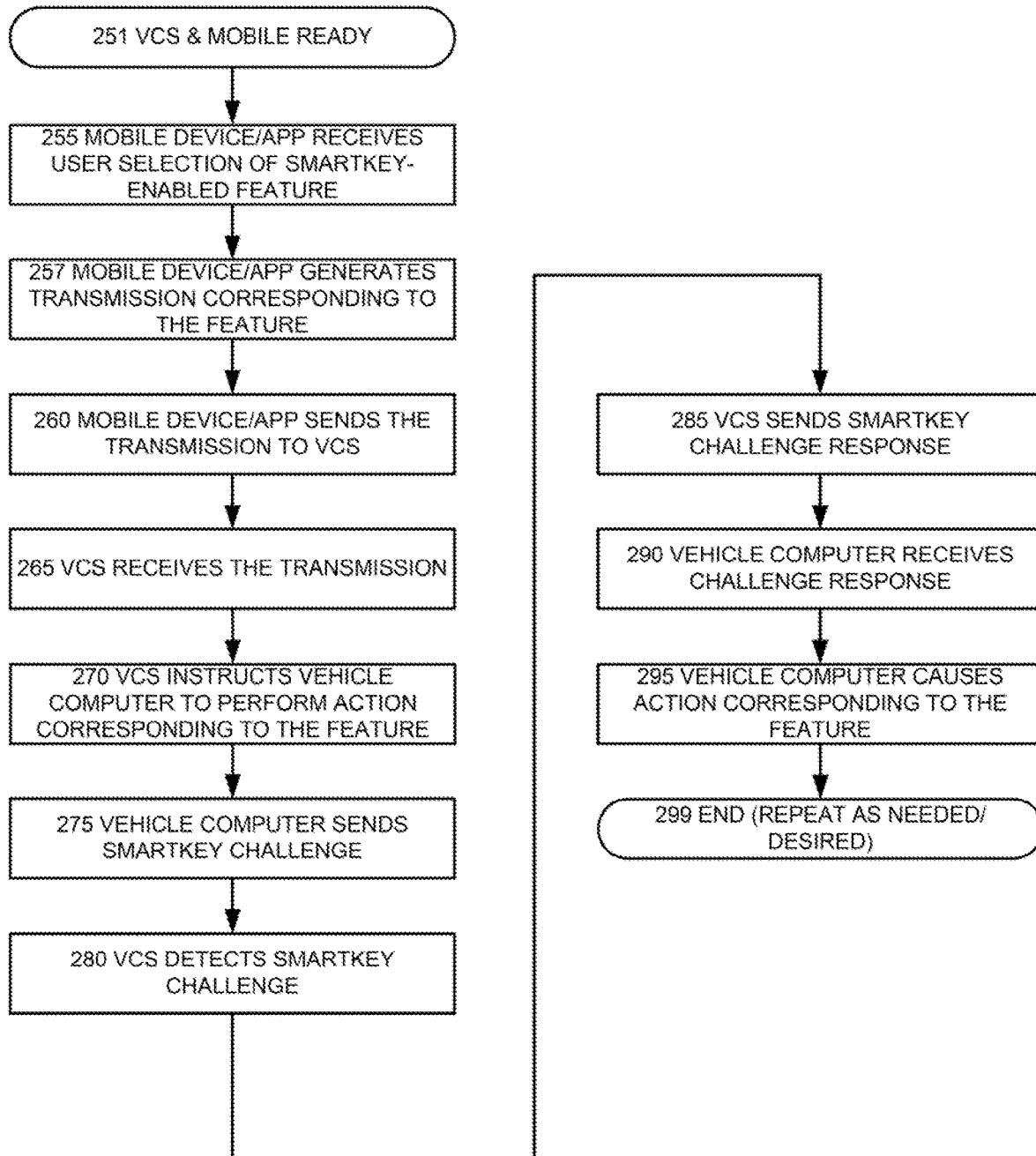
FIG. 2B illustrates selected steps of an exemplary smartphone-as-a-key process that allows a menu selection by a user of a mobile device, in accordance with selected aspects disclosed in this document.

Note that smartkey-enabled functions other than engine start may be performed in response to the VCS receiving corresponding transmissions from the mobile device with the app (which app may be referred to as "smartphone-as-a-key" or "SAAK" app). The process may be the same or substantially the same as the process 200, with the following variances. At the beginning of this modified process, the user of the authorized mobile device selects a menu item corresponding to another smartkey-enabled feature (e.g., lock/unlock/arm/disarm), and the mobile device sends the transmission corresponding to the selected feature. The VCS receives the transmission, and the vehicle electronics and/or the VCS activate the selected feature and perform the function(s) associated with the selected feature. FIG. 2B illustrates selected steps of a process 250 of an exemplary operation of the system in response to a selected feature sent by the mobile to the VCS. The feature may be selected through a menu-driven user interface, or otherwise.

Beginning with flow point 251, in which the mobile and the VCS are ready, the process flow proceeds to step 255, in which the mobile/app receives user selection of a smartkey-enabled feature. The user may input the selection via a menu of the app.

In step 257, the mobile/app generates a transmission corresponding to the selected feature, for transmission to the VCS.

In step 260, the mobile/app sends the transmission to the VCS, for example, through a Bluetooth® or another short-range radio frequency communication link between the VCS and the mobile device.

In step 265, the VCS receives the transmission.

In step 270, the VCS instructs the vehicle computer to perform the action corresponding to the selected smartkey-enabled feature. For example, the VCS may send a message to the vehicle computer through the CAN or analogous bus of the vehicle.

In step 275, the vehicle computer transmits a smartkey challenge, to verify the presence of the smartkey in or in the immediate vicinity of the vehicle. (Recall that the selected feature is a smartkey-enabled feature.)

In step 280, the VCS detects the challenge, and in step 285 generates and transmits back an appropriate challenge response. As has already been discussed, the VCS may receive the challenge and send the challenge response through the CAN or a similar bus of the vehicle, or through the antenna used by the vehicle electronics to communicate with the vehicle's smartkeys.

The vehicle computer receives the challenge response in step 290, and in step 295 performs the action corresponding to the feature, such as locking/unlocking the vehicle, arming/disarming the vehicle's alarm system, and engine start.

The process 250 may then terminate at flow point 299, and may be repeated as needed or desired.

Figure 3:
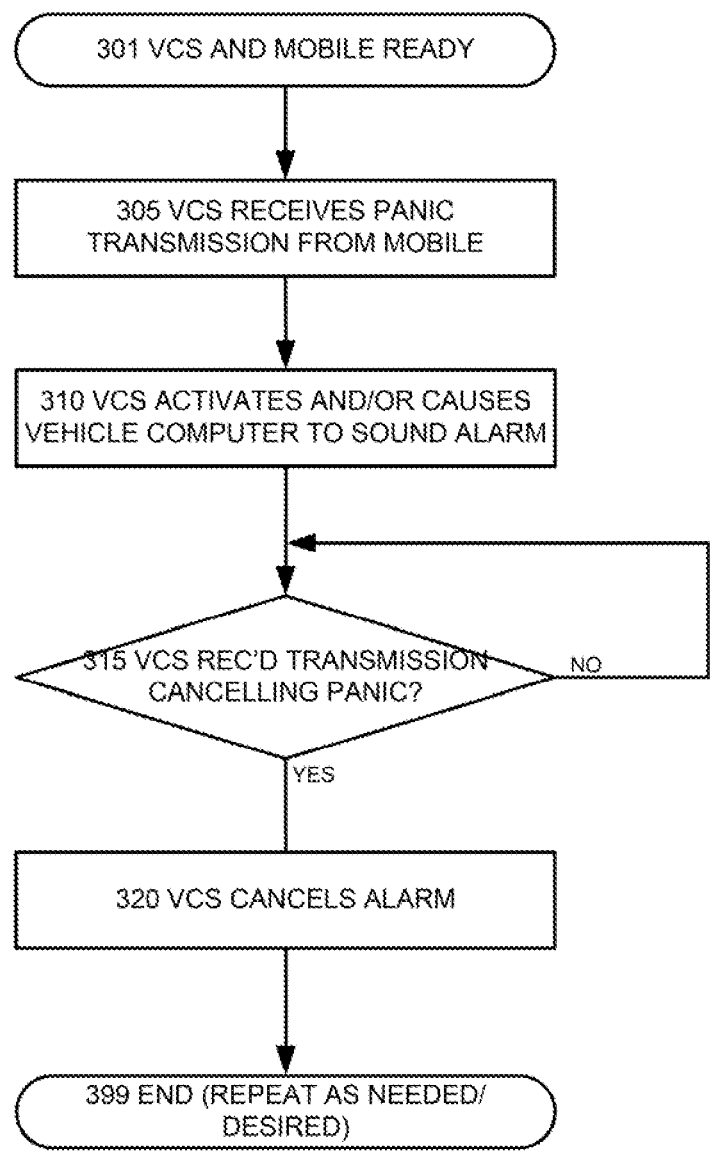
FIG. 3 illustrates selected steps of an exemplary smartphone-as-a-key process performed in response to activation of a panic button, in accordance with selected aspects disclosed in this document.

FIG. 3 illustrates selected steps of a process 300 of an exemplary operation of a smartkey-enabled panic button. At flow point 301, the VCS and the SAAK smartphone are ready, and the smartphone had been previously associated (paired) with the VCS and is an authorized mobile device.

In step 305, the VCS receives from the smartphone a panic command sent in response to the user activating the panic function on the smartphone, such as touching a panic "button" on the screen of the smartphone.

In step 310, the VCS activates, either directly or through the vehicle's computer, panic function(s) of the vehicle, such as an alarm/siren.

In decision box 315, the VCS determines whether a command cancelling panic has been received from the mobile; such command may be another activation of the panic button or any other user-initiated command through the SAAK app of the mobile. The process loops back until the panic-cancelling command has been received.

Once the panic-cancelling command has been received, the process proceeds to step 320, in which the VCS cancels the alarm; again, the VCS may be configured to perform this step directly or through the vehicle's computer.

The process flow may then terminate at flow point 399, to be repeated as needed or desired.

Figure 4:
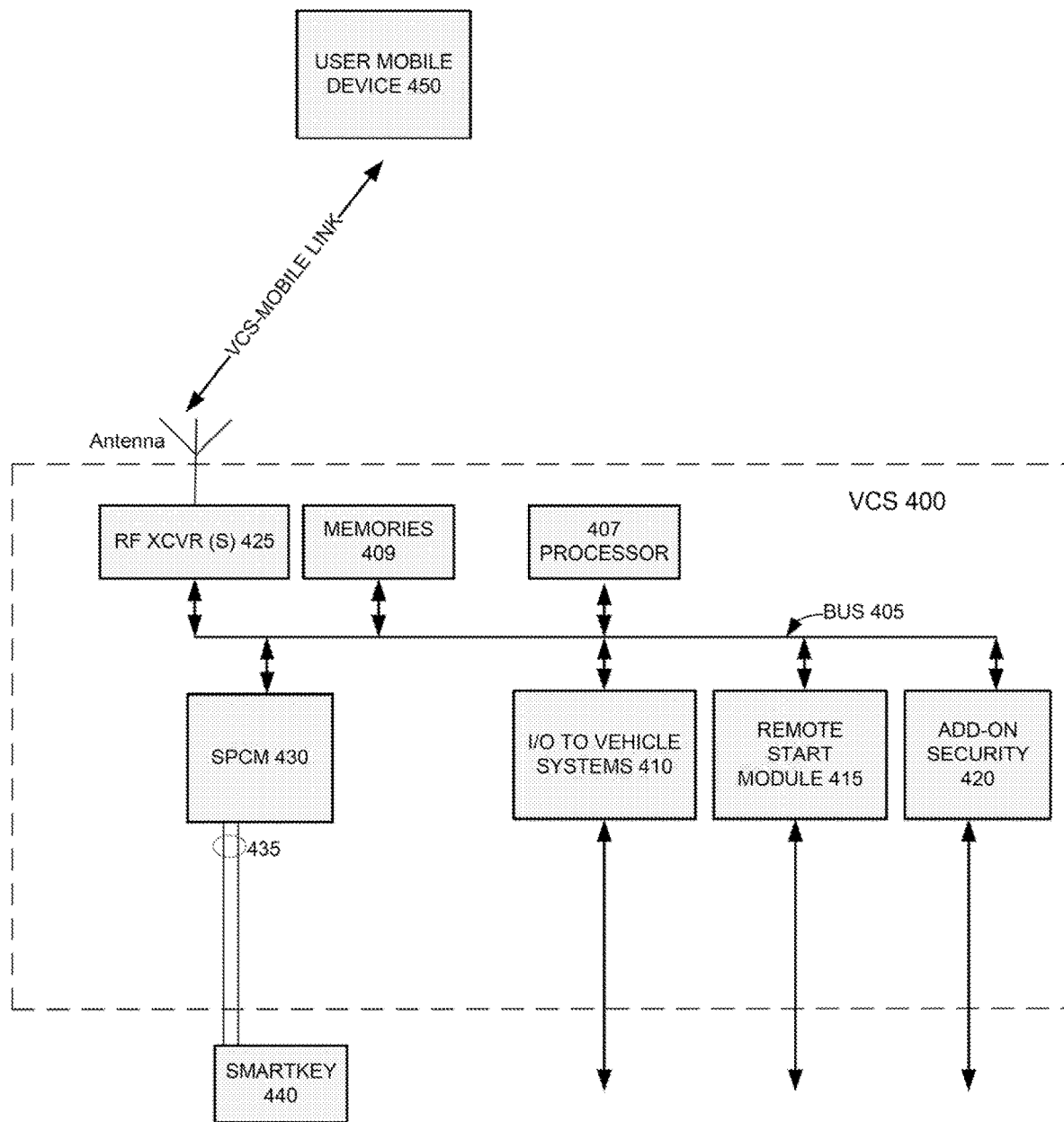
FIG. 4 illustrates selected components of a vehicle control systems, in accordance with selected aspects disclosed in this document.

FIG. 4 illustrates selected components of a Vehicle Control System 400 that includes a smartkey power control module through which the VCS selectively energizes and de-energizes a smartkey of the vehicle in which the VCS is installed, and thus enables and disables the smartkey-enabled features of the vehicle.

The VCS 400 includes a bus 405, a processing module 407, a memory module 409, an interface or interfaces 410 to vehicle control modules, a remote start module 415, an add-on security module 420, a relatively short range RF communication interface/transceiver(s) 425 to external devices, and a smartkey power control module (SPCM) configured to provide selectively electrical power to a smartkey 440. The smartkey 440 may be considered part of the VCS 400, or a separate component.

The bus 405 may be as a processor-based system bus that provides communication/networking capability between and among the components of the VCS 400. The processing module 407 may include, for example, a microprocessor/microcontroller and supporting electronics. The memory module 409 can store instructions executable by the processing module 407; the memory module 409 may include one or more memories of same or different types, such as ROMs, PROMs, EPROMS, EEPROMS, flash memories, optical disks, magnetic storage devices, and/or other memories. The interface or interfaces 410 may connect to an engine computer (engine control module or ECM); a transmission computer (transmission control module or TCM); built-in vehicle firmware; built-in security features of the vehicle; a telematics module; and data storage for data that includes the vehicle's usage and performance data, such as OBD II data. The interface 410 may be a CAN bus interface. The remote start module 415 allows starting of the vehicle by the VCS 400, in response to appropriate commands, for example, remote start commands received from the user mobile device 450. The remote start module 415 may also interact with the vehicle control modules through the interfaces 410 accessible through the bus 405. The add-on security module 420 may connect to and monitor various sensors (e.g., shock/vibration, proximity, intrusion, door or other entry point controls that indicate when the user is trying to open the entry point for access to the vehicle), and may operate and/or control various convenience features (e.g., power windows, power locks, power seats, steering wheel telescoping and tilt positions, audio system presets and other audio system controls). The relatively short range RF communication transceiver(s) 425 can be, for example, a Bluetooth® interface. The transceiver(s) 425 may be another type of RF interface. Moreover, multiple relatively short range RF transceivers may be included. Thus, a first transceiver and a second transceiver may be included, the first transceiver 425 having a shorter communication range than the second transceiver. For example, the transmit power of the first transceiver 425 may be less than the transmit power of the second transceiver 425 by a factor of 2-20, with the two transceivers 425 being of the same type (such as Bluetooth®) or of different types; the first transceiver 425 may be a Bluetooth® LE transceiver, while the second transceiver 425 may be a non-LE Bluetooth®) transceiver.

Figure 5A:
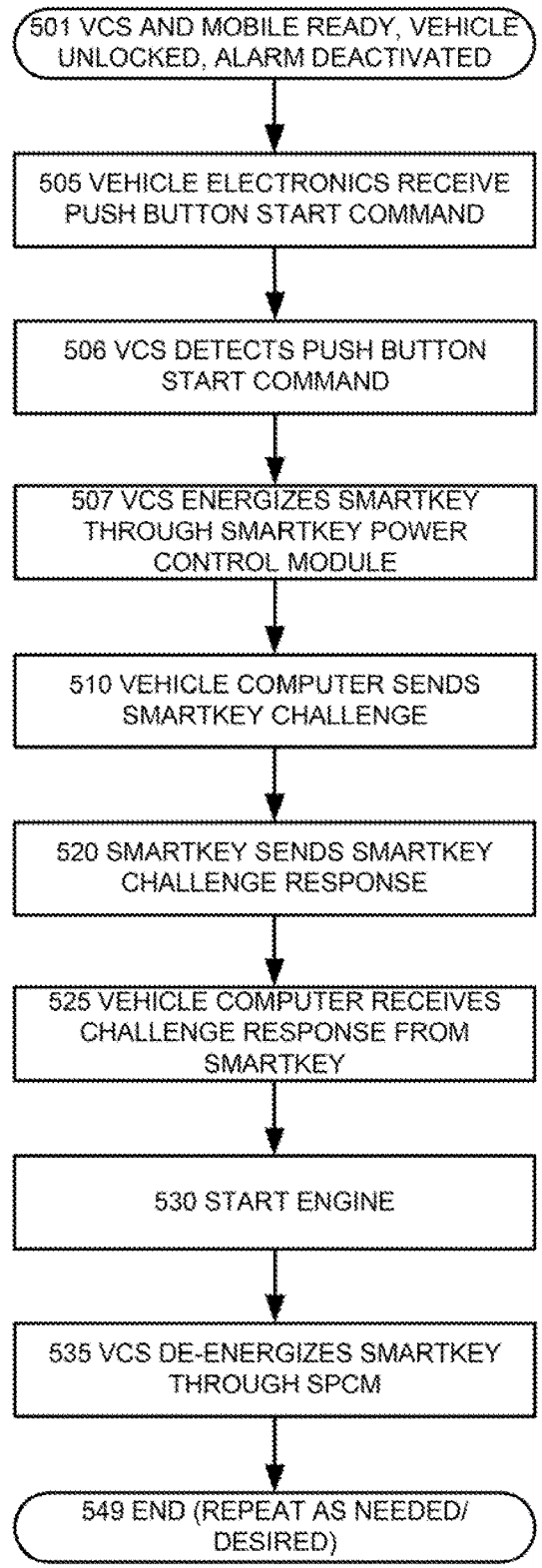
FIG. 5A illustrates selected steps of an exemplary smartphone-as-a-key process performed in response to activation of an engine start button, in accordance with selected aspects disclosed in this document.

FIG. 5A illustrates selected steps of a process 500 of an exemplary engine start operation of the system in which a smartkey is connected to the VCS through a smartkey power control module (SPCM). At flow point 501 (such as the state of the mobile device and the VCS after the vehicle is unlocked in the process 100 or a similar process), the electronics/computer of the vehicle receives the start command from the start button of the vehicle, in step 505.

In step 506, the VCS also detects the start command. The VCS may detect the start command, for example, through the CAN or analogous bus of the vehicle. The VCS and the vehicle electronics/computer may detect the start command at the same or substantially same time.

In step 507, the VCS energizes the smartkey through the smartkey power control module. For example, the processor of the VCS under control of program code applies a relay control voltage to the SPCM to close relay contacts (which may be normally open) and complete the circuit that powers the smartkey instead of the battery.

In step 510, the vehicle electronics send a challenge, to verify that the smartkey is in the vehicle.

In step 520, the smartkey (which is now energized) receives the challenge and responds with an appropriate smartkey challenge response.

The vehicle electronics/computer receives the challenge response, in step 525, and starts the engine, in step 530.

Once the engine has started, the VCS de-energizes the smartkey, in step 535, so that the SPCM stops providing power to the smartkey. In variants, this step is skipped, at least as long as the vehicle's engine is operating.

The process flow may then terminate at flow point 549, and may be repeated as needed or desired.

Figure 5B:
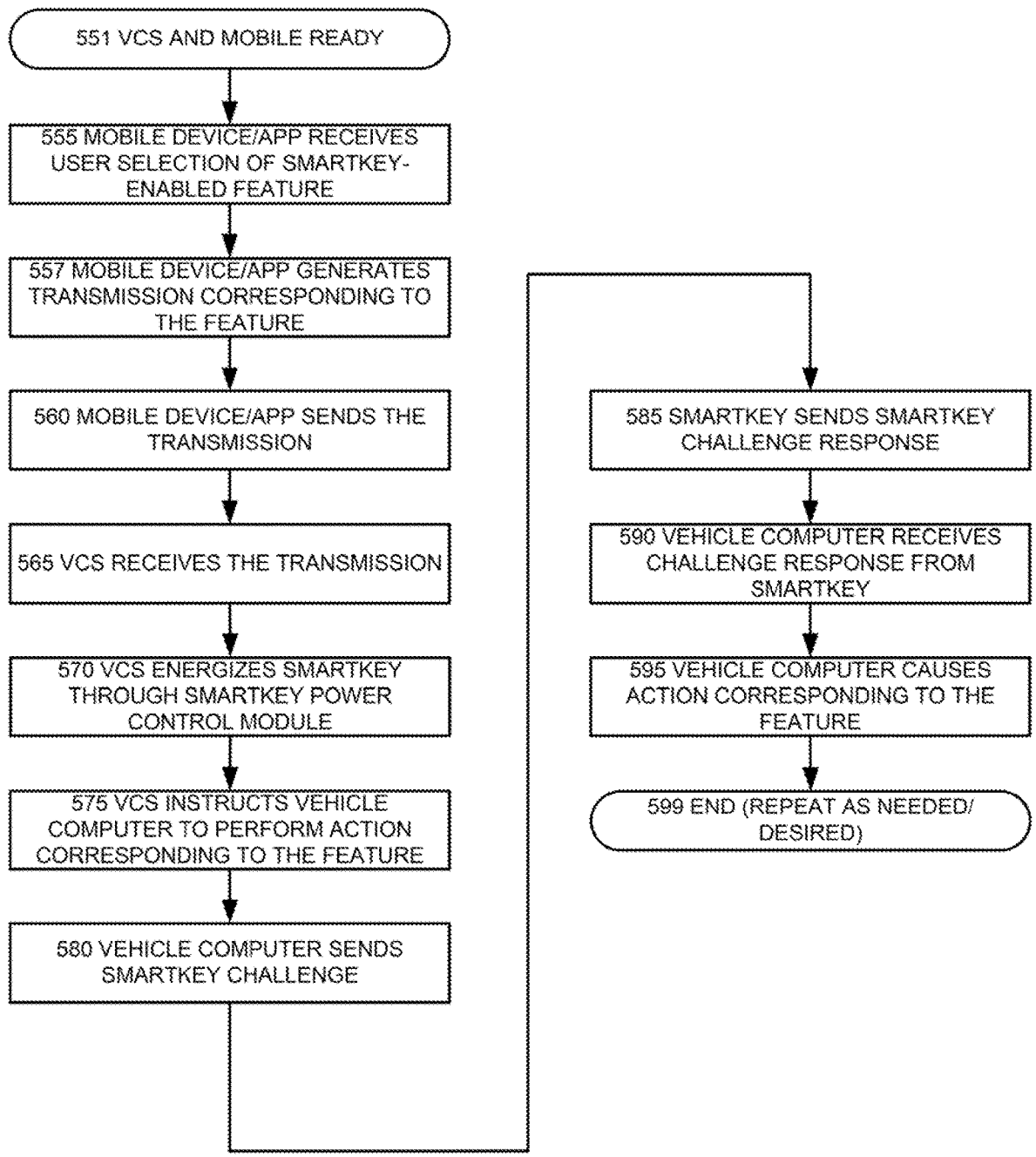
FIG. 5B illustrates selected steps of another exemplary smartphone-as-a-key process that allows a menu selection by a user of a mobile device, in accordance with selected aspects disclosed in this document.

FIG. 5B illustrates selected steps of a process 550 in which smartkey-enabled functions are performed in response to the VCS receiving corresponding commands/transmissions from the mobile device with the SAAK app, and the VCS is connected to a smartkey through a smartkey power control module.

Beginning with flow point 551, in which the mobile and the VCS are ready, the process flow proceeds to step 555, in which the mobile/app receives user selection of a smartkey-enabled feature, such as lock/unlock the vehicle, activate/deactivate alarm of the vehicle, start engine of the vehicle. The user may input the selection via a menu of the app.

In step 557, the mobile/app generates a transmission corresponding to the selected feature, for sending to the VCS.

In step 560, the mobile/app sends the transmission to the VCS, for example, through a Bluetooth® or another short-range radio frequency communication link between the mobile device and the VCS.

In step 565, the VCS receives the transmission.

In step 570, the VCS energizes the smartkey through the smartkey power control module. For example, the processor of the VCS under control of the VCS software applies voltage to the SPCM to close the normally open relay contacts and complete the circuit that powers the smartkey instead of the battery.

In step 575, the VCS instructs the vehicle computer to perform the action(s) corresponding to the selected feature. For example, the VCS may do so through the vehicle CAN bus.

In step 580, the vehicle computer transmits a smartkey challenge, to verify the presence of the smartkey in or in the immediate vicinity of the vehicle. (Recall that the selected feature is a smartkey-enabled feature.)

In step 585, the smartkey (which is now energized) receives the challenge and responds with an appropriate smartkey challenge response.

The vehicle computer/electronics receives the challenge response, in step 590, and performs the action(s) corresponding to the selected feature, in step 595. For example, the vehicle computer may lock/unlock the vehicle, arm/disarm the vehicle's alarm, start the vehicle's engine.

The process 550 may then terminate at flow point 599, and may be repeated as needed or desired.

FIG. 6A illustrates selected steps of a process 600 of an exemplary passive keyless entry operation of the system in which a smartkey is connected to the VCS through a smartkey power control module (SPCM). At flow point 601, the VCS and the user mobile device such as a SAAK smartphone are ready, and the smartphone had been previously associated (paired) with the VCS.

In step 605, the VCS and the smartphone establish a communication link using their short range transceivers, such as Bluetooth® transceivers. Once the link is established, the VCS authenticates the smartphone as an authorized mobile device for the vehicle controlled by the VCS, in step 610. The VCS then checks whether the smartphone is sufficiently near the vehicle to unlock the vehicle, in decision block 615, and loops back until the condition for unlocking the vehicle is met. After the condition has been met (estimated vehicle-smartphone distance is shorter than a predetermined limit, the power transmitted by the Bluetooth® transceiver of the smartphone exceeds some predetermined power limit, and/or otherwise as described in this document and the incorporated documents), the process flow advances to step 620. In the step 620, the VCS operates the SPCM to energize the smartkey of the vehicle. In step 625, the VCS unlocks one or more entry points (doors, etc.) of the vehicle. The VCS may unlock the vehicle directly or instruct the vehicle computer to unlock the vehicle. The process flow then terminates at flow point 649, to be repeated as needed or desired.

FIG. 6B illustrates selected steps of a process 650 of an exemplary passive keyless vehicle locking operation. At flow point 651, the vehicle may be unlocked, and the VCS is ready. In decision block 660, the VCS checks whether the smartphone is sufficiently far from the vehicle to lock the vehicle; this may be the case, e.g., if no Bluetooth® link can be established with the mobile device, if the estimated distance to the vehicle is greater than some predetermined distance limit, or if the power transmitted by the Bluetooth® transceiver of the smartphone is below some predetermined power limit. Once the VCS determines that the smartphone is far enough to lock the vehicle, the VCS operates the SPCM to energize the smartkey of the vehicle, in step 665, and locks the vehicle, in step 670. The VCS may lock the vehicle directly or instruct the vehicle's computer to lock the vehicle. The VCS may then operate the SPCM to de-energize the smartkey, in step 675. The process flow then terminates at flow point 699, to be repeated as needed.

Figure 7:
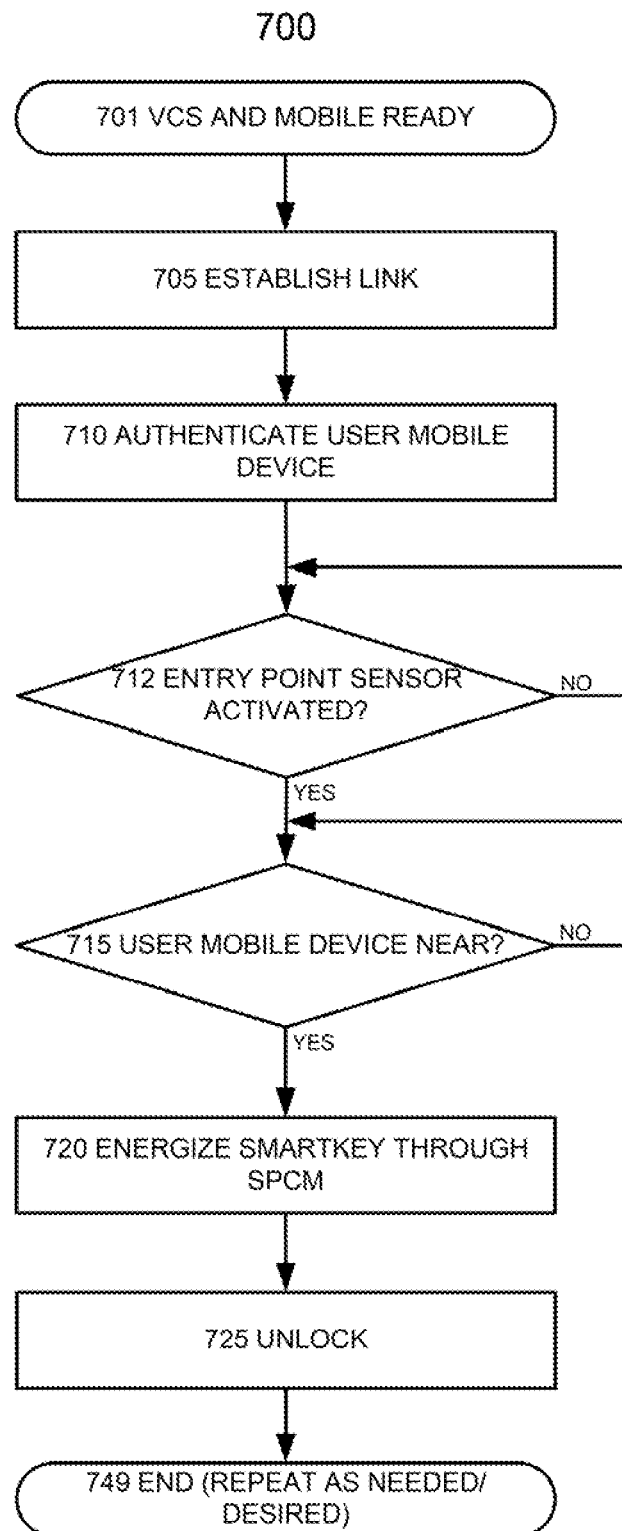
FIG. 7 illustrates selected steps of another exemplary passive keyless entry process, in accordance with selected aspects disclosed in this document.

FIG. 7 illustrates selected steps of a process 700 of an exemplary passive keyless entry operation of the system in which a smartkey is connected to the VCS through a smartkey power control module, and the vehicle is equipped with door handle sensors. At flow point 701, the VCS and the smartphone are ready, and the smartphone had been previously associated with the VCS.

In step 705, the VCS and the smartphone establish a communication link using their short range transceivers, such as Bluetooth® transceivers. Once the link is established, the VCS authenticates the smartphone as an authorized mobile device for the vehicle controlled by the VCS, in step 710. In the loop created by decision block 712, the VCS monitors the entry point (such as door) sensors, detecting when the entry point (door handle) sensors are activated in an apparent attempt to enter the vehicle. Once a door sensor is activated, the process flow advances to decision block 715, where the VCS checks whether the smartphone is sufficiently near the vehicle to unlock the vehicle, and loops back until the condition for unlocking the vehicle is met. After the condition has been met (estimated vehicle-smartphone distance is longer than a predetermined limit, the power transmitted by the Bluetooth® transceiver of the smartphone is below some predetermined power limit, and/or otherwise as described in this document and the incorporated documents), the process flow advances to step 720. In the step 720, the VCS operates the SPCM to energize the smartkey of the vehicle. In step 725, the VCS unlocks one or more entry points (doors, etc.) of the vehicle. The process flow may then terminate at flow point 749, to be repeated as needed or desired.

Figure 8:
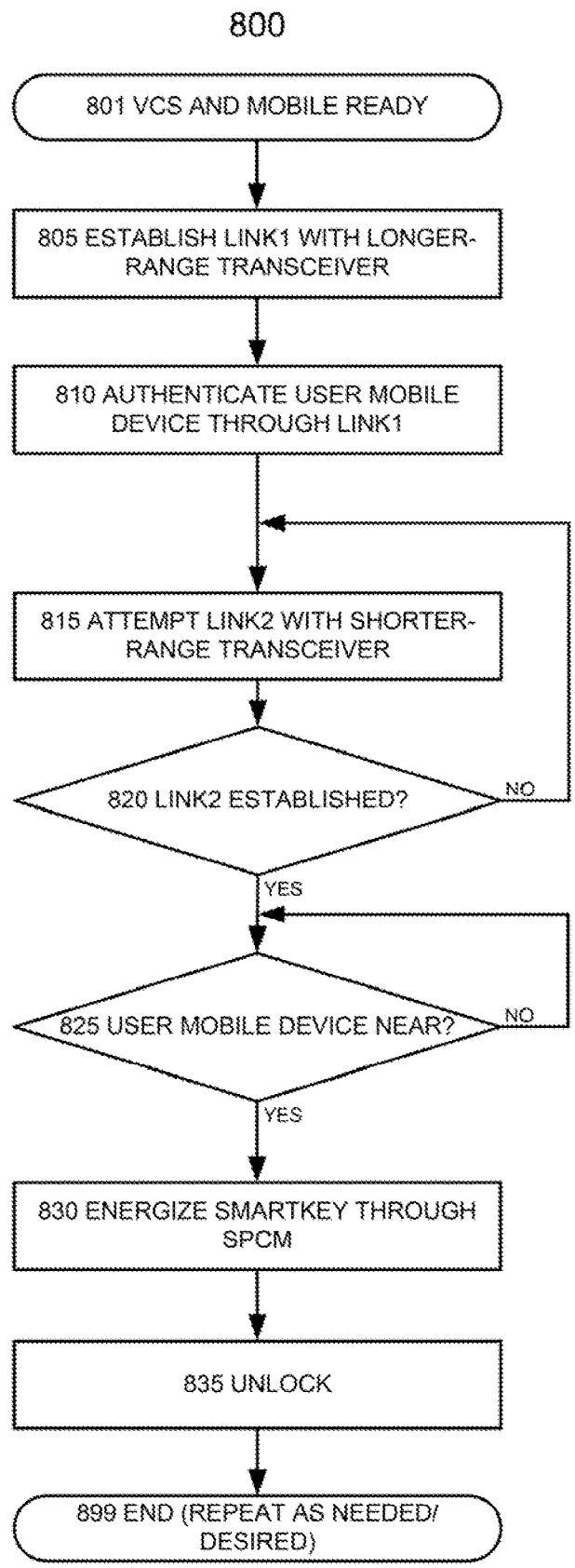
FIG. 8 illustrates selected steps of still another exemplary passive keyless entry process, in accordance with selected aspects disclosed in this document.

FIG. 8 illustrates selected steps of a process 800 of an exemplary passive keyless entry operation of the system in which a smartkey is connected to the VCS through a smartkey power control module, and the VCS includes two relatively short range RF transceivers, the first transceiver having a longer communication range than the second transceiver.

At flow point 801, the VCS and the smartphone are ready, and the smartphone had been previously associated (paired) with each of the two transceivers of the VCS. In step 805, the VCS and the smartphone establish a communication link using the first (longer range) transceiver of the VCS. Once this link ("link1") is established, the VCS through link1 authenticates the smartphone as an authorized mobile device for the vehicle controlled by the VCS, in step 810. In step 815, the VCS attempts to establish "link2" with the smartphone using the second (shorter range) transceiver. In decision block 820, the VCS determines whether link2 has been successfully established. If not, the process flow loops back to the step 815. Once link2 has been established, the VCS proceeds to determine whether the smartphone is sufficiently near the vehicle to unlock one or more entry points of the vehicle, in decision block 825. When the smartphone is sufficiently near the vehicle, the VCS operates the SPCM to energize the smartkey, in step 830, and unlocks one or more entry points of the vehicle, in step 835. The process flow may then terminate at flow point 899, to be repeated as needed.

Figure 9:
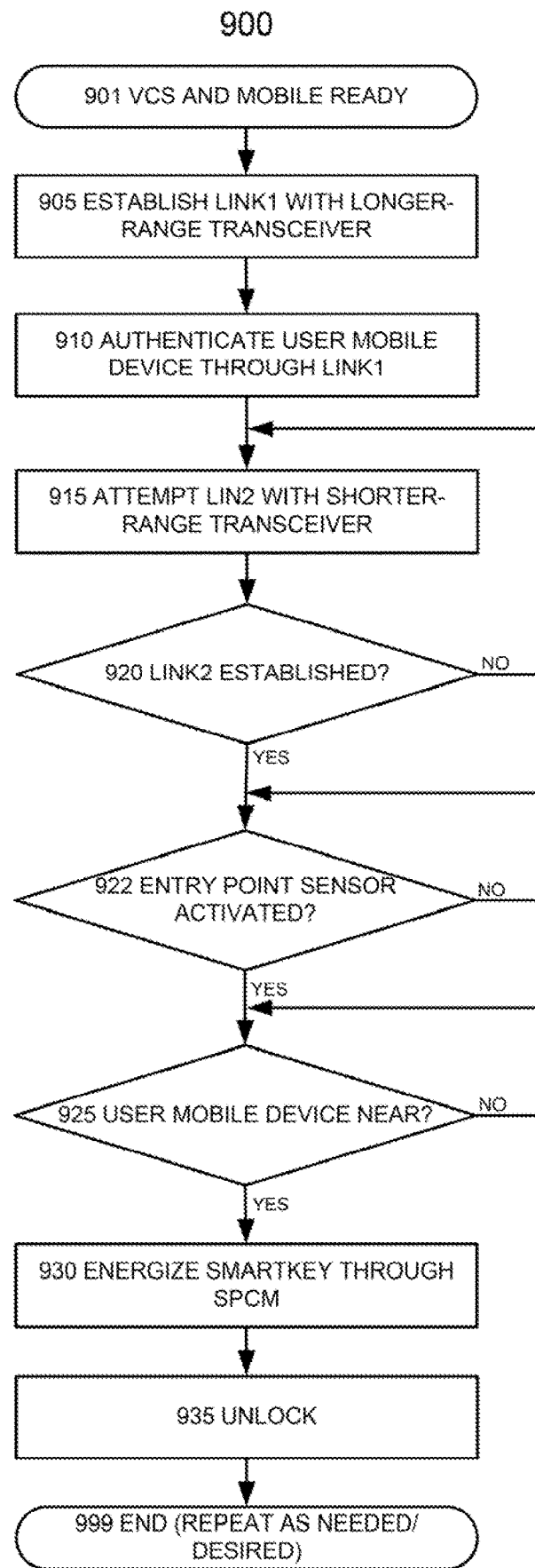
FIG. 9 illustrates selected steps of yet another exemplary passive keyless entry process, in accordance with selected aspects disclosed in this document.

FIG. 9 illustrates selected steps of a process 900 of an exemplary passive keyless entry operation of the system in which a smartkey is connected to the VCS through a smartkey power control module, the VCS includes two relatively short range RF transceivers with the first transceiver having a longer communication range than the second transceiver, and the vehicle is equipped with door handle sensors.

At flow point 901, the VCS and the smartphone are ready, and the smartphone had been previously associated (paired) with each of the two transceivers of the VCS. In step 905, the VCS and the smartphone establish a communication link using the first (longer range) transceiver of the VCS. Once this link ("link1") is established, the VCS through link1 authenticates the smartphone as an authorized mobile device for the vehicle controlled by the VCS, in step 910. In step 915, the VCS attempts to establish "link2" with the smartphone using the second (shorter range) transceiver. In decision block 920, the VCS determines whether link2 has been successfully established. If not, the process flow loops back to the step 915. Once link2 has been established, the process advances to the loop created by decision block 922, where the VCS monitors the entry point (such as door) sensors, detecting when the entry point (door handle) sensors are activated in an apparent attempt to enter the vehicle. When an entry point sensor is activated, the process advances to decision block 925, where the VCS checks whether the smartphone is sufficiently near the vehicle to unlock the vehicle, and loops back until the condition for unlocking the vehicle is met. After the condition has been met (e.g., estimated vehicle-smartphone distance is longer than a predetermined limit, the power transmitted by the Bluetooth® transceiver of the smartphone is below some predetermined power limit, and/or otherwise as described in this document and the incorporated documents), the process advances to step 930. In this step, the VCS operates the SPCM to energize the smartkey. The VCS then unlocks (directly or through the vehicle's computer) one or more entry points of the vehicle, in step 935. The process flow may then terminate at flow point 99, to be repeated as needed.

In another application, the VCS is associated/paired with multiple mobile devices. For example, the VCS of the vehicle may be associated/paired with two or more smartphones of family members. In another example, the app on the user's smartphone (or on multiple smartphones with sufficient authorization) may create a "valet key" as a digital token that can be sent to another smartphone. The valet key may be sent via email, text, Near Field Communication, user smartphone app-to-valet smartphone app communications, or in another way. The other smartphone may have an app such as the app on the user's smartphone, or another app with similar capability. When the other smartphone sends the token to the VCS of the vehicle, for example, through a Bluetooth® or analogous relatively-short range link, the VCS may allow full or limited accessibility of the other smartphone to the vehicle and/or full/limited performance of the vehicle. For example, the valet key, when used, may dictate that the VCS of the vehicle prevent access to the vehicle's trunk and glove compartment, and to the vehicle's wireless communication system so that it will not be used to make calls and send messages that appear to come from the user/owner of the vehicle. The VCS may also limit power available from the engine/motor of the vehicle. The valet key may also be limited geographically, for example, based on GPS position of the vehicle. The valet key may be set to expire at a preset or user-selected time (or after a predetermined or user-defined period); once expired, the valet key will no longer allow access to the vehicle. In this way, the use of the user's smartphone as a key may be extended to valet and other attendants, without requiring the user to part with the smartphone and entrust it to the valet.

This document and the attached Figures describe a VCS and a mobile device configured to replace a vehicle key. In specific embodiments, a VCS senses the presence of the authorized mobile device and takes automatic action in response to its approach and/or departure, allows smartkey-enabled features to operate when the SAAK user sends appropriate commands from the authorized mobile device, and/or allows smartkey-enabled functions to be performed when the user operates the vehicle (such as engine start). It should be noted, however, that not all of the functionality need to be present in the same system. More generally, not every illustrated/described step and decision block may be required in every embodiment in accordance with the concepts described in this document, while some steps and decision blocks that have not been specifically illustrated may be desirable or necessary in some embodiments in accordance with the concepts. The process steps and decisions may be performed by same and/or separate elements, in conjunction or in parallel, asynchronously or synchronously, in a pipelined manner, or otherwise. There is no particular requirement that the steps and decisions be performed in the same order in which this description lists them and/or the Figures show them, except where a specific order is inherently required, explicitly indicated, or is otherwise made clear from the context. Specific embodiments/variants/examples/implementations, however, use the particular order(s) in which the steps and decisions (if applicable) are shown and/or described. The features (elements/steps/limitations) described throughout this document, the attached Figures, and the incorporated documents may be present individually, or in any combination or permutation, except where the presence or absence of specific features is inherently required, explicitly indicated, or is otherwise made clear from the description and the drawings. This applies whether or not the features appear related to specific embodiments; in other words, features of one described or illustrated embodiment (of this document and the incorporated documents) may be included in another described or illustrated embodiment.

The instructions (machine executable code) corresponding to the method steps of the disclosed embodiments, variants, examples, and implementations may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for use of a smartphone or another mobile device as a key. This was done for illustration purposes and, therefore, the foregoing description is not necessarily intended to limit the spirit and scope of the invention(s) described. Neither the specific embodiments of the invention(s) as a whole, nor those of its (or their, as the case may be) features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. A method of operating smartkey-enabled features of a vehicle by a vehicle control system (VCS) installed in the vehicle, the method comprising:

detecting an approach of an authorized mobile device to within a first predetermined distance of the vehicle, the authorized mobile device being authorized to access one or more of the smartkey-enabled features of the vehicle; and in response to the approach of the authorized mobile device to within the first predetermined distance of the vehicle, configuring a smartkey power control module (SPCM) of the VCS from a first configuration in which the SPCM does not provide electrical power to a smartkey coupled to the SPCM, to a second configuration in which the SPCM provides electrical power to the smartkey, thereby enabling access to the one or more of the smartkey-enabled features of the vehicle;

wherein, when the SPCM is providing electrical power to the smartkey, operation of smartkey-enabled features of the vehicle is enabled and when the SPCM is not providing electrical power to the smartkey, operation of the smartkey-enabled features of the vehicle is not enabled.

2. The method of claim 1, wherein:
the VCS performs the step of detecting based on strength of a received radio frequency (RF) signal transmitted by the authorized mobile device to the VCS.

3. The method of claim 1, wherein:
the step of detecting comprises sensing at least one action selected from the group consisting of activation of a handle of an entry point of the vehicle and activation of an external button mounted on the vehicle.

4. The method of claim 3, wherein:
the step of detecting is performed in response to the at least one action.

5. The method of claim 1, further comprising:
sensing an indication that the authorized mobile device is sufficiently far from the vehicle to lock the vehicle;
locking the vehicle; and
configuring the SPCM from the second configuration to the first configuration to stop providing electrical power to the smartkey and thereby disable operation of the smartkey-enabled features;
wherein:
the VCS performs the step of sensing based on strength of a received radio frequency (RF) signal transmitted by the authorized mobile device to the VCS, so that the indication that the authorized mobile device is sufficiently far from the vehicle is present when no RF communication link can be established with the authorized mobile device; and
the steps of locking and configuring the SPCM from the second configuration to the first configuration are performed in response to the indication.

6. The method of claim 1, further comprising:
sensing an indication that the authorized mobile device is sufficiently far from the vehicle to lock the vehicle;
locking the vehicle; and
configuring the SPCM from the second configuration to the first configuration to stop providing electrical power to the smartkey and thereby disable operation of the smartkey-enabled features;
wherein:
the VCS performs the step of sensing based on strength of a received radio frequency (RF) signal transmitted by the authorized mobile device to the VCS, so that the indication that the authorized mobile device is sufficiently far from the vehicle is present when the strength of the received RF signal transmitted by the authorized mobile device to the VCS is below a predetermined signal strength threshold; and
the steps of locking and configuring the SPCM from the second configuration to the first configuration are performed in response to the indication.

7. The method of claim 1, wherein the step of configuring the SPCM of the VCS from the first configuration to the second configuration comprises the step of selectively connecting power to the smartkey.

8. The method of claim 1, further comprising:
unlocking the vehicle, in response to the approach of the authorized mobile device to within the first predetermined distance of the vehicle.

9. The method of claim 1, further comprising:
unlocking at least one entry point of the vehicle, in response to the approach of the authorized mobile device to within the first predetermined distance of the vehicle.

10. The method of claim 1, further comprising:
deactivating one or more security features of the vehicle, in response to the approach of the authorized mobile device to within the first predetermined distance of the vehicle.

11. The method of claim 1, wherein:
the step of detecting comprises establishing a Radio Frequency (RF) communication link between an RF transceiver of the VCS and the authorized mobile device.

12. The method of claim 11, wherein the step of establishing the RF communication link comprises operating the RF transceiver in accordance with a Bluetooth® protocol and the RF communication link is a Bluetooth® link.

13. The method of claim 11, wherein:
the step of detecting further comprises recognizing the authorized mobile device through the RF communication link.

14. The method of claim 13, further comprising:
receiving by the VCS through the RF communication link a command corresponding to a smartkey-enabled action of the smartkey-enabled actions; and
causing by the VCS the smartkey-enabled action to be performed in response to the step of receiving.

15. The method of claim 14, wherein the smartkey-enabled action comprises starting an engine of the vehicle.

16. The method of claim 14, wherein the smartkey-enabled action comprises deactivating one or more security features of the vehicle.

17. The method of claim 14, wherein the smartkey-enabled action comprises changing a state of a climate control system of the vehicle.

18. A method of operating smartkey-enabled features of a vehicle through a vehicle control system (VCS) installed in the vehicle, the method comprising:
establishing a Radio Frequency (RF) communication link between an RF transceiver of the VCS and an authorized mobile device, the authorized mobile device being authorized to access one or more of the smartkey-enabled features of the vehicle;
receiving by the VCS through the RF communication link a command corresponding to a smartkey-enabled action;
configuring a smartkey power control module (SPCM) of the VCS from a first configuration in which the SPCM does not provide electrical power to a smartkey coupled to the SPCM to a second configuration in which the SPCM provides electrical power to the smartkey; and
causing the smartkey-enabled action to be performed in response to the step of receiving.

19. The method of claim 18, wherein the step of establishing the RF communication link comprises operating the RF transceiver in accordance with a Bluetooth® protocol and the RF communication link is a Bluetooth® link.

20. The method of claim 19, wherein the smartkey-enabled action is selected from the group consisting of locking the vehicle, unlocking the vehicle, activating one or more security features of the vehicle, deactivating one or more security features of the vehicle, starting an engine of the vehicle, turning on a climate control system of the vehicle, and turning off the climate control system of the vehicle.

21. A method of operating smartkey-enabled features of a vehicle through a vehicle control system (VCS) installed in the vehicle, the method comprising:
- establishing a Radio Frequency (RF) communication link between an RF transceiver of the VCS and an authorized mobile device, the authorized mobile device being authorized to access one or more of the smartkey-enabled features of the vehicle;
- obtaining an estimate of distance from the vehicle to the authorized mobile device;
- receiving by the VCS through the RF communication link a command corresponding to a smartkey-enabled action; and
- if the estimate is less than a predetermined limit,
  - configuring a smartkey power control module (SPCM) of the VCS from a first configuration in which the SPCM does not provide electrical power to a smartkey coupled to the SPCM to a second configuration in which the SPCM provides electrical power to the smartkey, and
  - causing the smartkey-enabled action to be performed in response to the step of receiving.

\* \* \* \* \*